US010288508B2

(12) United States Patent
Kober et al.

(10) Patent No.: US 10,288,508 B2
(45) Date of Patent: May 14, 2019

(54) PRESSURE SENSOR, ESPECIALLY PRESSURE DIFFERENCE SENSOR

(71) Applicant: ENDRESS+HAUSER GmbH + Co. KG, Maulburg (DE)

(72) Inventors: Timo Kober, Dietzenbach (DE); Michael Philipps, Lorrach (DE); Dieter Stolze, Potsdam (DE); Anh Tuan Tham, Berlin (DE); Roland Werthschutzky, Kleinmachnow (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 135 days.

(21) Appl. No.: 15/341,563

(22) Filed: Nov. 2, 2016

(65) Prior Publication Data

US 2017/0074735 A1  Mar. 16, 2017

Related U.S. Application Data

(62) Division of application No. 13/503,804, filed as application No. PCT/EP2010/064983 on Oct. 7, 2010, now abandoned.

(30) Foreign Application Priority Data

Oct. 30, 2009 (DE) .................. 10 2009 046 229

(51) Int. Cl.
*G01L 9/00* (2006.01)
*G01L 19/06* (2006.01)
*C03B 23/00* (2006.01)

(52) U.S. Cl.
CPC ........ *G01L 9/0042* (2013.01); *C03B 23/0026* (2013.01); *G01L 19/0618* (2013.01)

(58) Field of Classification Search
CPC .............. G01L 9/0042; G01L 19/0618; C03B 23/0026
See application file for complete search history.

(56) References Cited

U.S. PATENT DOCUMENTS 4,458,537 A * 7/1984 Bell .................... G01L 13/025
361/283.3
4,572,000 A 2/1986 Kooiman
(Continued)

FOREIGN PATENT DOCUMENTS

DE       10132269 A1    1/2003
DE    102006058927 A1    6/2008
(Continued)

OTHER PUBLICATIONS

German Search Report in corresponding Appln. No. 10 2009 046 229.5 dated Oct. 12, 2010.
(Continued)

*Primary Examiner* — Xin Y Zhong
(74) *Attorney, Agent, or Firm* — Bacon & Thomas, PLLC

(57) ABSTRACT

The pressure sensor of the invention includes at least one platform, at least one measuring membrane 30, and a transducer, wherein the measuring membrane comprises a semiconductor material, wherein the measuring membrane, enclosing a pressure chamber, is secured on the platform, wherein the measuring membrane is contactable with at least one pressure and is elastically deformable in a pressure-dependent manner, wherein the transducer provides an electrical signal dependent on deformation of the measuring membrane, wherein the platform has a membrane bed, on which the measuring membrane lies in the case of overload, in order to support the measuring membrane, wherein the membrane bed 21 has a glass layer 20, whose surface faces the measuring membrane and forms a wall of the pressure chamber, wherein the surface of the glass layer has a contour, which is suitable for supporting the measuring
(Continued)

membrane 30 in the case of overload, characterized in that the contour of the membrane bed 21 is obtainable by a sagging of an unsupported region of a glass plate at increased temperature, due to the force of gravity on the unsupported region of the glass plate, and subsequent cooling of the glass plate.

7 Claims, 2 Drawing Sheets

(56) References Cited

U.S. PATENT DOCUMENTS

| | | | |
|---|---|---|---|
| 4,578,735 A | | 3/1986 | Knecht et al. |
| 4,833,920 A | | 5/1989 | Knecht et al. |
| 5,381,299 A | * | 1/1995 | Provenzano .......... G01L 9/0073 29/25.42 |
| 6,019,135 A | | 2/2000 | Onishi |
| 6,267,009 B1 | | 7/2001 | Drewes et al. |
| 6,971,859 B2 | | 12/2005 | Yamamoto et al. |
| 7,360,431 B2 | | 4/2008 | Yoneda et al. |
| 2004/0107731 A1 | | 6/2004 | Doehring |
| 2007/0026238 A1 | * | 2/2007 | Chiappetta .......... C03B 23/0252 428/426 |

FOREIGN PATENT DOCUMENTS

| | | |
|---|---|---|
| DE | 102008043171 A1 | 4/2010 |
| WO | 2010_046149 A1 | 4/2010 |

OTHER PUBLICATIONS

International Search Report in corresponding International Appln. No. PCT/EP2010/064983 dated Jan. 28, 2011.

Kyung-Oh Min et al., "Micro/Nano Glass Press Molding Using Silicon Carbide Molds Fabricated by Silicon Lost Molding", Micro-Electro Mechanical Systems, 18th IEEE International Conference Jan. 30-Feb. 3, 2005, pp. 475-478.

* cited by examiner

PRESSURE SENSOR, ESPECIALLY PRESSURE DIFFERENCE SENSOR

TECHNICAL FIELD

The present invention relates to a pressure sensor, especially a pressure difference sensor.

BACKGROUND DISCUSSION

Pressure sensors comprise a platform, a measuring membrane and a transducer, wherein the measuring membrane is secured on the platform, wherein the measuring membrane is contactable with at least one pressure and has a pressure-dependent elastic deformation, and wherein the transducer provides an electrical signal dependent on the deformation of the measuring membrane, wherein the platform, furthermore, has a membrane bed, on which the measuring membrane lies in the case of overload, in order to support the measuring membrane.

In such case, it is advantageous that the membrane bed has a contour approximating the natural pressure-dependent deformation, i.e. a contour matching that of the so-called deflection curve. It is difficult, however, to manufacture such a membrane bed in a reproducible and cost-effective manner.

The shaping of the bed as well as its manufacture depend on the material of the membrane bed and of the substrate, which bears the membrane bed, and what sort of joining technology is selected for joining the platform or the membrane bed with the membrane.

Especially suitable for pressure difference sensors are Si platforms, since these withstand the static pressure well. There exist various methods for connection of two silicon chips, such as, for example eutectic bonding or silicon direct bonding. In view of the requirements for a hermetically sealed and fixed connection of the components, which, in spite of this, has no major after-effects, these bonding methods according to the state of the art deliver a yield and reproducibility, which is still capable of improvement. Additionally, the manufacture of, for example, spherically concave beds according to U.S. Pat. No. 7,360,431 B2 of YAMATAKE is not directly possible in silicon. Currently known are either the non-established methods of gray scale lithography or a direct grinding/polishing of the silicon, which leads to reproducible results only with great effort.

The yet unpublished patent application DE 102008043171 discloses a pressure sensor comprising at least one platform, at least one measuring membrane and a transducer, wherein the measuring membrane comprises a semiconductor material (especially silicon), wherein the measuring membrane, enclosing a pressure chamber, is secured to the platform, wherein the measuring membrane is contactable with at least one pressure and is elastically deformable in a pressure-dependent manner, wherein the transducer provides an electrical signal dependent on the deformation of the measuring membrane, wherein the platform has a membrane bed, against which the measuring membrane lies in the case of overload, in order to support the measuring membrane, characterized in that the membrane bed has a glass layer, whose surface faces the measuring membrane and forms a wall of the pressure chamber. The surface of the glass layer is especially provided with a contour, which is suitable for supporting the measuring membrane in the case of overload. For this, the surface of the glass layer can be micromechanically processed. The glass layer can likewise have a surface contour, which is prepared by means of hot embossing. Furthermore, this patent application discloses that it is advantageous that the membrane bed has a surface contour, which is approximately the same as the deflection curve of the measuring membrane, or equals such.

Although this procedure leads to satisfactory results as regards the quality of the membrane beds, alternatives to the pressure sensors manufactured in such a way are still desired.

SUMMARY OF THE INVENTION

An object of the invention is to provide a pressure sensor, especially a pressure difference sensor, and a method for its manufacture, which can be implemented cost effectively and with improved yield and improved reproducibility.

The pressure sensor of the invention includes at least one platform, at least one measuring membrane, and a transducer, wherein the measuring membrane comprises a semiconductor material, wherein the measuring membrane, enclosing a pressure chamber, is secured to the platform, wherein the measuring membrane is contactable with at least one pressure and is elastically deformable in a pressure-dependent manner, wherein the transducer provides an electrical signal dependent on the deformation of the measuring membrane, wherein the platform a has a membrane bed, on which the measuring membrane lies in the case of overload, in order to support the measuring membrane, wherein the membrane bed has a glass layer, whose surface faces the measuring membrane and forms a wall of the pressure chamber, wherein the surface of the glass layer has a contour, which is suitable for supporting the measuring membrane in the case of overload, characterized in that the contour of the membrane bed is obtainable by a sagging of an unsupported region of a glass plate, which forms the glass layer at increased temperature, due to the force of gravity on the unsupported region of the glass plate and subsequent cooling of the glass plate.

In a further development of the invention, the platform comprises a substrate, which has a surface facing the glass layer, which supports the glass layer, wherein the surface has a cavity, via which the contour of the membrane bed is formed.

In given cases, the cavities of the side facing away from the membrane bed can be filled with a fill material, in order to prevent hollow spaces under the glass layer. The fill material can especially comprise a glass, which, for example, is applied in the form of glass frit, and which has a lower melting temperature than the glass of the glass layer. Additionally, the underside of substrate and glass facing away from the membrane bed can be leveled by grinding, lapping and/or polishing.

In an alternative embodiment of the invention, the leveling, lapping and/or polishing for leveling of the underside of substrate and glass facing away from the membrane bed can occur completely without prior filling of the unsupported region of the glass layer.

In a currently preferred embodiment, the glass of the glass layer or of the membrane bed includes a borosilicate glass, which is matched to the coefficient of expansion of the substrate material of the platform. Especially suitable glasses are, for example, Pyrex 7740, TEMPAX, Hoya SD-2, or Borofloat 33, which is obtainable from the firm, Schott.

The substrate material is preferably a semiconductor material, especially silicon.

According to a further development of the invention, the glass layer has a thickness of not less than 100 µm, preferably not less than 200 µm and further preferably not less than 400 µm.

According to a further development of the invention, the glass layer has a material thickness of no more than 2000 µm, preferably no more than 1400 µm and further preferably no more than 1000 µm.

Furthermore, it is currently preferable that the membrane bed has an aspherical surface contour, especially approximately the deflection curve of the measuring membrane, or equal thereto.

This results to a first approximation via the horizontal orientation of the supported region of the glass layer during a tempering of the glass layer, in order to allow the unsupported region of the glass layer to sink, and during the subsequent cooling of the glass layer.

For manufacture of the contour of the membrane bed, the glass layer can, for example, be connected in the planar state with a surface of the platform, which has the required cavities, or can be placed, non-affixed, on the surface, after which the glass layer is heated, in order to induce the sinking of the unsupported regions.

In the case of prior connection between glass layer and platform, this can be produced, for example, via anodic bonding.

To the extent that the glass layer is only placed non-affixedly, the connection between the platform and the glass layer can be produced during the heating via a silicon oxide layer on the surface of a silicon substrate.

Instead of preparing the membrane bed on the platform, the glass layer can be heated on a mold, which has corresponding cavities, in order for the unsupported regions to be caused to sink. Due to the multiple reuse of the mold, this justifies a greater effort for its manufacture. The means the cavities under the unsupported region can be embodied in such a manner, that the unsupported region, after a certain sag depth, can, for example, be locally supported, in order locally to limit the sinking. Fundamentally, it is, however, currently preferably, that the contour be formed without the influence of local support.

In a further development of the invention, at least the concave contour region of the membrane bed remains free of the influence of tools on the roughness of the surface of the glass layer facing the measuring membrane. The surface can nevertheless be largely smooth, and indeed, in the sense that no local raised portions or depressions occur, which could lead to local stresses and ultimately to a breaking of the measuring membrane to be supported.

Independently of whether the membrane bed is formed on a mold or on the platform, it can be advantageous to level the surface of the supported region of the glass layer, after the contour is formed in the unsupported region. The leveling can occur, for example, via grinding, lapping and/or polishing. A need for leveling can arise, for example, when, in the case of the sinking of the unsupported region of the glass plate, the upper side and the underside of the glass plate in the supported region different are exposed to boundary conditions, for example due to the underside lying on the substrate and the upper side being free, which leads to markedly different shear forces on the upper side and underside.

In a further development of the invention, it is consequently provided to lay a plate on the upper side of the glass plate, wherein this plate has cavities aligning with the cavities of the substrate, and lies on the supported regions of the glass body.

This plate can be removed again after preparation of the contour of the membrane bed. In a variant of the invention, the laid-on plate includes an opening with a greater inner cross section than the unsupported region, so that, in each case, an annular edge section of the supported region of the glass plate surrounds an unsupported region. This is sufficient, on the one hand, to effect a sufficiently planar upper side of the glass layer in the annular edge section of the supported region, and, on the other hand, the size of the edge region allows a measuring membrane to be secured thereon. In this way, the removal of the laid-on plate can be omitted.

With a membrane bed prepared according to the invention, the overload resistance of a pressure sensor can be increased significantly. For example, an Si measuring membrane with a measuring range of 10 mbar and with a material thickness of 30 µm and a diameter of, for instance, 5 mm in and of itself—that is without support—has an overload resistance of, for instance, 1 bar. When the measuring membrane can support itself on the membrane bed of the invention, the overload resistance rises therewith to at least 50 bar, especially to at least 100 bar, preferably to at least 140 bar and especially preferably to at least 160 bar.

The named pressure values refer especially to a pressure sensor with a measuring range of 10 mbar. For larger measuring ranges, it is preferable when the overload resistance is likewise larger. For example, a pressure sensor with a measuring range of 500 mbar should have an overload resistance of at least 100 bar, preferably at least 300 bar, further preferably at least 420 bar and especially preferably 500 bar.

In the case of a pressure difference sensor, the overload resistance is preferably effective in both directions.

The pressure sensor of the invention can be an absolute pressure sensor, which measures pressure as compared to vacuum, or a relative pressure sensor, which measures pressure as compared to atmospheric pressure.

The present invention is, however, especially relevant for pressure difference sensors, which register the difference between a first pressure and a second pressure. For precisely in the case of pressure difference sensors, the danger of large, static, one-side overloads exists, since the pressure difference to be measured is usually significantly smaller than the first or second pressure, whose difference is to be registered. Therefore, in a currently preferred embodiment, the pressure sensor of the invention is a pressure difference sensor, which has a measuring membrane, a first platform and a second platform, wherein the measuring membrane is arranged between the first platform and the second platform, and is connected with each of the two platforms, enclosing a first pressure chamber and a second pressure chamber, wherein the first pressure chamber and the second pressure chamber each have at least one duct through the first and, respectively, second platforms, respectively, wherein the measuring membrane is contactable via the ducts with first and second pressures. The deflection of the membrane then depends on the difference between the first pressure and the second pressure.

The pressure sensor of the invention can have any transducer known to those skilled in the art, in order to transduce a pressure-dependent or pressure-difference-dependent deformation of the measuring membrane into an electrical signal. In such case, especially capacitive or (piezo-) resistive transducers are options for such purpose. For capacitive transducers, electrodes are provided on the measuring membrane and on the membrane bed, which are to be prepared on the membrane bed, for example, by vapor deposition of a metal. Measuring membranes made of Si can either be provided with an electrode likewise via metallizing or by doping. Piezoresistive transducer structures are manufactured, for example, by preparing the resistance elements of a full bridge by doping the membrane.

The method of the invention for manufacture of a membrane bed for a pressure sensor, includes steps of: (a) Providing a planar glass layer, (b) applying the glass layer on a support body, which has a surface, which supports the glass layer, wherein the surface has at least one cavity, so that the glass layer is not supported in the region of the cavity, (c) heating the glass layer to a temperature or temperature range, at which the unsupported region of the glass layer sinks, and (d) allowing the glass layer to cool.

In a further development of the method, the glass layer, after reaching a temperature, at which the unsupported region sinks, can be held for a time at this temperature, so that the glass layer can sink to a sufficient extent.

The holding time is, in such case, especially dependent on the selected temperature and the layer thickness. For a borosilicate glass for panes with a thickness of some 100 µm, it can, for example, be given by the relationship t=a*d+b, wherein the value for a at 750° C. lies, for example, between 0.1 and 0.8, especially between 0.2 and 0.6, and the value for b lies between −60 and 20, especially between −40 and 0, wherein t is the time in minutes and d the thickness of the glass layer in µm.

The preparation of the membrane bed contour occurs preferably on one undivided wafer for a plurality of pressure sensors. The connection of the measuring membrane with the platform or the membrane bed of the platform occurs preferably on one undivided wafer.

In the case of a pressure difference sensor, the measuring membrane is to be arranged between two substrates and, respectively, their membrane beds. The connection between the glass layer of the membrane bed and the silicon of the measuring membrane can occur especially via anodic bonding.

To the extent that a plurality of sensors are manufactured in parallel in the wafer composite, a separating of the sensors occurs finally, for example, via sawing.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
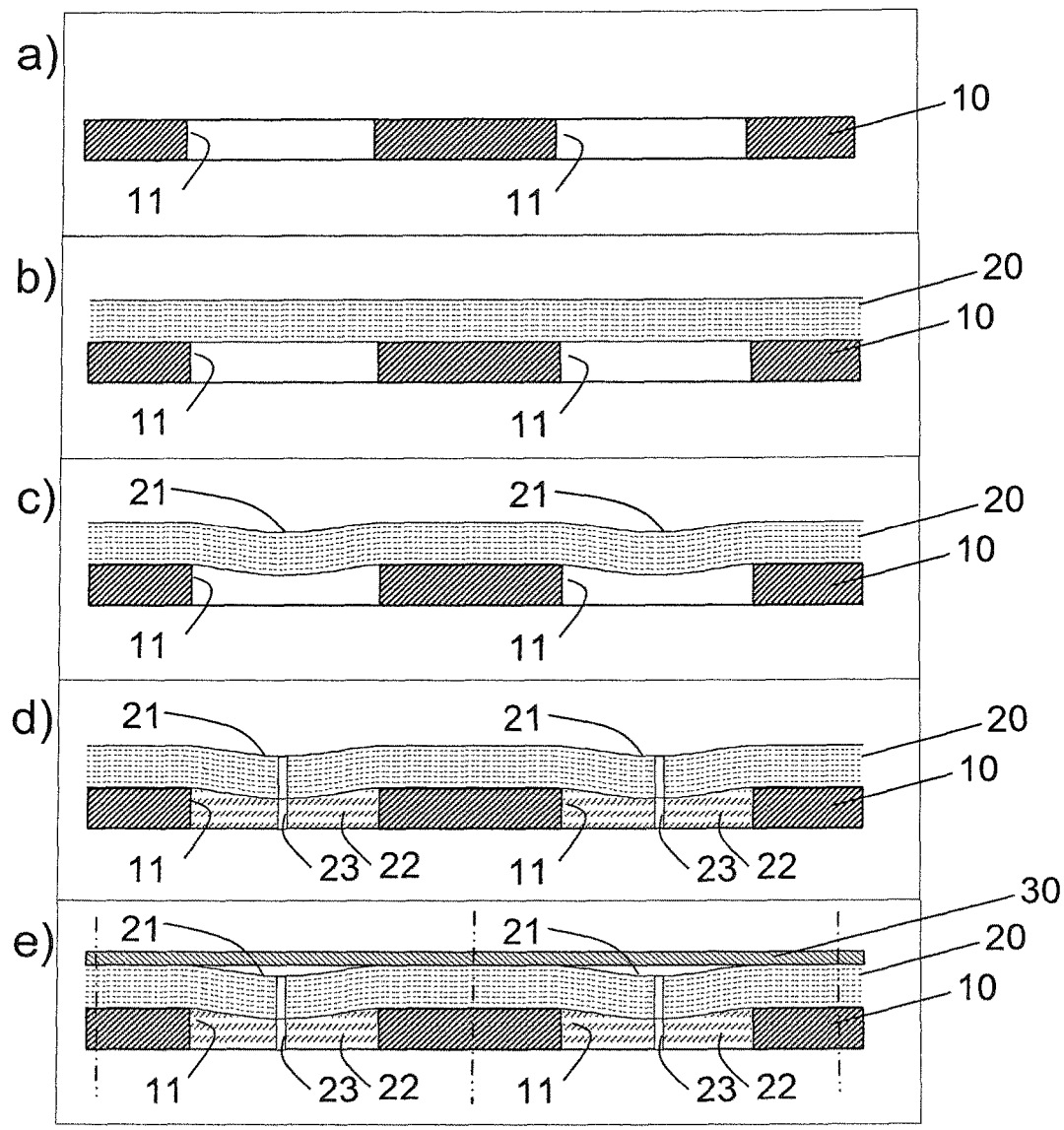
FIG. 1 A schematic sectional illustration of steps for preparing the membrane beds and for manufacture of a relative pressure sensor of the invention.

The sequence of manufacturing steps shown in FIG. 1 begins in step (a) with a Si wafer 10 with a thickness of 420 µm, in which, in a first step, depressions 11 are prepared. The depressions 11 can be manufactured, for example, by (ultrasound) drilling and/or etching. Precision is of the essence in the case of manufacturing the depressions only insofar as the depressions 11 are not allowed to degrade the behavior of the unsupported region of a glass plate during the following preparation steps. In a basic variant of the method of the invention, this only means that the cross sectional area of the recess or cavity must be matched to the desired shape of a measuring membrane. Insofar as the measuring membrane is applied here as a planar plate, the opportunity is provided to implement a circular symmetry in the measuring membrane. The depressions 11 can have a diameter of a few mm, for example, 3 to 10 mm, preferably 4 to 6 mm. In the example, the diameter amounts to 5 mm.

In a second step (b), a glass plate 20 with a thickness of a few 100 µm is applied on the silicon wafer 10, wherein the glass plate is placed under cleanroom conditions, non-affixedly on the silicon wafer. The glass plate comprises a borosilicate glass, for example, Borofloat 33. In the example of an embodiment, the glass plate has a thickness of, for instance, 500 µm.

In a third step (c), the stack with the substrate 10 and the glass plate 20 is heated over a period of time—for instance, 1.5 h—from room temperature to 750° C., and is then held, for instance for 3 h, at this temperature. In this time, on the one hand, the unsupported region of the glass plate sinks sufficiently deeply, wherein a contour 21 arises which is suitable as a membrane bed for supporting a measuring membrane in the case of overload, and, on the other hand, a mechanically fixed connection arises between the glass plate and the substrate, wherein Si atoms of the surface of the substrate are oxidized. The stack can then cool over a number of hours.

The currently applied temperature results from a performing of the heating step in an atmosphere of surrounding air in a furnace with a refractory lining. In the case of performing the heating step in a controlled atmosphere—for example, a protective gas—and/or a heating under cleanroom conditions, the temperature can be safely further increased, whereby also the time for the heating step can be shortened in the case of given geometric boundary conditions.

In a fourth step (d), remaining hollow spaces under the contours 21 can be filled with a fill material, especially with glass 22, wherein the glass can be applied, for example, in the form a fritted glass, whose melting point lies below the softening point of the glass of the glass plate 10. After the melting of the fritted glass and the cooling following thereafter, the underside facing away from the membrane beds can be leveled by grinding or lapping. Through the sequence of layers, ducts 23 are prepared with micromechanical preparation methods—for example, with ultrasonic drilling—wherein these ducts 23 in each case extend from the underside of the platform, which includes the substrate 10, the glass layer 10 and the glass filling 23, to the contour 21 of the membrane bed.

In a fifth step (e), a measuring membrane wafer 30, which especially comprises silicon, is connected by means of anodic bonding with the platforms in one undivided wafer. Then, the relative pressure sensors illustrated here can be separated by sawing along the illustrated perpendicular lines.

Figure 2:
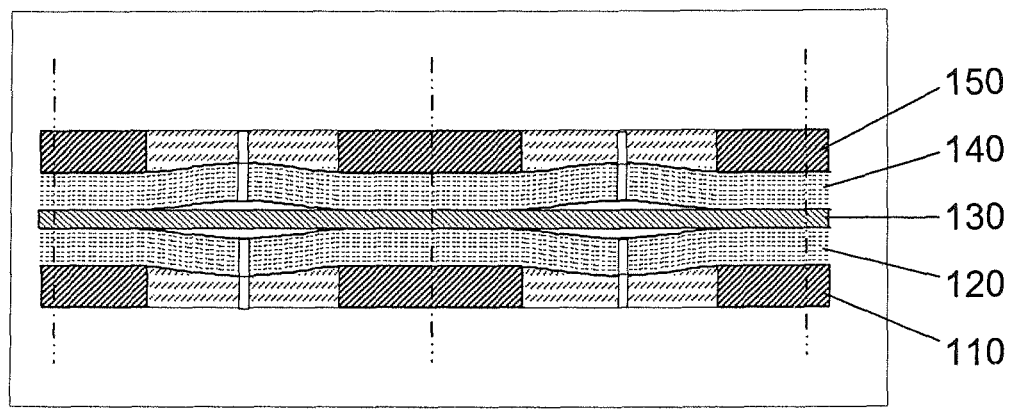
FIG. 2 a longitudinal section through an example of an embodiment of a charge of pressure difference sensors of the invention before separating, and FIG. 3 a representation of topography of membrane bed contours of pressure sensors of the invention.

FIG. 2 shows a longitudinal section through pressure difference sensors of the invention before their separation. For manufacture of pressure difference sensors, a measuring membrane wafer 130, which especially comprises silicon, is secured with two substrates as one undivided composite by means of anodic bonding. The platforms are in each case manufactured earlier corresponding to the preparation steps a through d from FIG. 1 using undivided wafers, in each case, with a substrate wafer 110, 150 and a glass plate 120, 140. Individual pressure difference sensors are finally obtained by separating along the vertical dashed lines.

Figure 3:
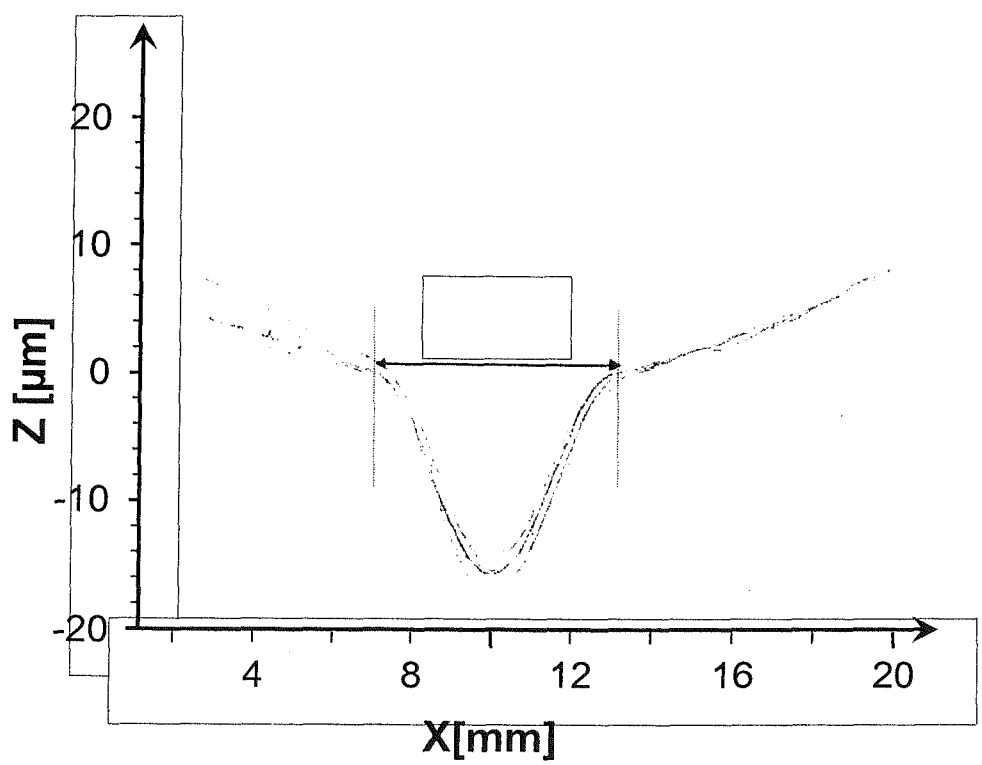

Finally, FIG. 3 shows topographic data of contours of membrane beds of the invention, wherein the unsupported region is denoted by the two vertical dotted lines and has a diameter of 5 mm.

As a result, defined aspherical contours can be prepared according to the described procedure, which are suitable for supporting measuring membranes in the case of overload. The present topographic data come from membrane beds, in the case of which the upper surface of the glass plate was free during the sinking. In this case, it is beneficial to level the supported region of the glass plate—for example, by grinding, lapping, and/or polishing—before mounting the measuring membrane. In a further development of the method, during preparation of the contours, a plate with cavities, which align with those of the substrate, is placed on the glass plate, which effects that the supported regions of the glass plate after preparation of the contours are essentially level, so that a further leveling becomes unnecessary.

What is claimed is:

1. A method for the preparation of a membrane bed of a pressure sensor, comprising the steps of:
   (a) providing a planar glass layer, said glass layer having a thickness of not less than 200 μm and not more than 2000 μm;
   (b) applying the glass layer on a support body, which has a surface, which supports the glass layer, wherein the surface has at least one cavity, so that the glass layer is not supported in the region of the cavity, said at least one cavity having a circular symmetry, and said at least one cavity having a diameter of 3 mm to 10 mm;
   (c) heating the glass layer to a temperature or temperature range, at which the unsupported region of the glass layer sinks; and
   (d) allowing the glass layer to cool,
   wherein the membrane bed obtained by said method has an aspherical surface contour, which approximates the deflection curve of a measuring membrane, supported by said membrane bed.

2. The method as claimed in claim 1, wherein:
the glass layer, after reaching a temperature, at which the unsupported region sinks, is held for a holding time at such temperature, so that the glass layer can sink to a sufficient extent.

3. The method as claimed in claim 2, wherein:
the holding time for a borosilicate glass is given by the relationship $$t = a*d + b;$$

the value for a at 750 ° C. lies between 0.1 and 0.8, and the value for b lies between −60 and 20, wherein t is the time in minutes and d the thickness of the glass layer in μm.

4. The method as claimed in claim 1, wherein:
the preparation of the membrane bed contour occurs on one undivided wafer for a plurality of membrane beds.

5. A method for manufacturing a pressure sensor, comprising:
preparing a membrane bed according to the method as claimed in claim 1, and joining a measuring membrane with a platform, or the glass layer of the platform, which forms the membrane bed.

6. The method as claimed in claim 3, wherein:
the value for a at 750 ° C. lies between 0.2 and 0.6.

7. The method as claimed in claim 3, wherein:
the value for b lies between −40 and 0.

* * * * *